United States Patent
Bocharov et al.

(10) Patent No.: US 8,224,905 B2
(45) Date of Patent: Jul. 17, 2012

(54) SPAM FILTRATION UTILIZING SENDER ACTIVITY DATA

(75) Inventors: Alexei V. Bocharov, Redmond, WA (US); Joshua T. Goodman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 261 days.

(21) Appl. No.: 11/567,632

(22) Filed: Dec. 6, 2006

(65) Prior Publication Data
US 2008/0140781 A1 Jun. 12, 2008

(51) Int. Cl.
*G06F 15/16* (2006.01)
(52) U.S. Cl. .......................... 709/206; 709/224; 713/154
(58) Field of Classification Search .................. 709/206, 709/217, 207, 200–203, 218–219, 220, 224, 709/227; 713/154
See application file for complete search history.

(56) References Cited

U.S. PATENT DOCUMENTS

| | | |
|---|---|---|
| 5,377,354 A | 12/1994 | Scannell et al. |
| 5,459,717 A | 10/1995 | Mullan et al. |
| 5,619,648 A | 4/1997 | Canale et al. |
| 5,638,487 A | 6/1997 | Chigier |
| 5,704,017 A | 12/1997 | Heckerman et al. |
| 5,805,801 A | 9/1998 | Holloway et al. |
| 5,835,087 A | 11/1998 | Herz et al. |
| 5,884,033 A | 3/1999 | Duvall et al. |
| 5,905,859 A | 5/1999 | Holloway et al. |
| 5,911,776 A | 6/1999 | Guck |
| 5,930,471 A | 7/1999 | Milewski et al. |
| 5,999,932 A | 12/1999 | Paul |
| 5,999,967 A | 12/1999 | Sundsted |
| 6,003,027 A | 12/1999 | Prager |
| 6,023,723 A | 2/2000 | McCormick et al. |
| 6,041,321 A | 3/2000 | Fabbrizio et al. |
| 6,041,324 A | 3/2000 | Earl et al. |
| 6,047,242 A | 4/2000 | Benson |
| 6,052,709 A | 4/2000 | Paul |
| 6,101,531 A | 8/2000 | Eggleston et al. |
| 6,112,227 A | 8/2000 | Heiner |
| 6,122,657 A | 9/2000 | Hoffman, Jr. et al. |
| 6,128,608 A | 10/2000 | Barnhill |
| 6,144,934 A | 11/2000 | Stockwell et al. |
| 6,157,921 A | 12/2000 | Barnhill |
| 6,161,130 A | 12/2000 | Horvitz et al. |
| 6,167,434 A | 12/2000 | Pang |
| 6,192,114 B1 | 2/2001 | Council |

(Continued)

FOREIGN PATENT DOCUMENTS

CN 1350247 (A) 5/2002

(Continued)

OTHER PUBLICATIONS

Allman, "Spam, Spam, Spam, Spam, Spam, the FTC, and Spam" Queue, Sep. 2003, pp. 62-69, vol. 1 Issue 6, ACM.

(Continued)

*Primary Examiner* — Moustafa M Meky
(74) *Attorney, Agent, or Firm* — Lee & Hayes, PLLC

(57) ABSTRACT

Spam is identified by computing sender reputation derived from historical activity data across counts for various categories. A spam filter or machine learning system can be trained utilizing pre-categorized data in conjunction with activity data associated with a sender aggregated across at least one time period. This sender activity filter can be employed alone or in combination with other filters to facilitate classification of messages as spam or non-spam.

17 Claims, 12 Drawing Sheets

U.S. PATENT DOCUMENTS

| | | |
|---|---|---|
| 6,192,360 B1 | 2/2001 | Dumais et al. |
| 6,195,698 B1 | 2/2001 | Lillibridge et al. |
| 6,199,102 B1 | 3/2001 | Cobb |
| 6,199,103 B1 | 3/2001 | Sakaguchi et al. |
| 6,249,807 B1 | 6/2001 | Shaw et al. |
| 6,266,692 B1 | 7/2001 | Greenstein |
| 6,308,273 B1 | 10/2001 | Goertzel et al. |
| 6,314,421 B1 | 11/2001 | Sharnoff et al. |
| 6,321,267 B1 | 11/2001 | Donaldson |
| 6,324,569 B1 | 11/2001 | Ogilvie et al. |
| 6,327,617 B1 | 12/2001 | Fawcett |
| 6,330,590 B1 | 12/2001 | Cotten |
| 6,332,164 B1 | 12/2001 | Jain |
| 6,351,740 B1 | 2/2002 | Rabinowitz |
| 6,370,526 B1 | 4/2002 | Agrawal et al. |
| 6,393,465 B2 | 5/2002 | Leeds |
| 6,421,709 B1 | 7/2002 | McCormick et al. |
| 6,424,997 B1 | 7/2002 | Buskirk, Jr. et al. |
| 6,427,141 B1 | 7/2002 | Barnhill |
| 6,434,600 B2 | 8/2002 | Waite et al. |
| 6,449,635 B1 | 9/2002 | Tilden, Jr. et al. |
| 6,453,327 B1 | 9/2002 | Nielsen |
| 6,477,551 B1 | 11/2002 | Johnson et al. |
| 6,484,197 B1 | 11/2002 | Donohue |
| 6,505,250 B2 | 1/2003 | Freund et al. |
| 6,519,580 B1 | 2/2003 | Johnson et al. |
| 6,546,390 B1 | 4/2003 | Pollack et al. |
| 6,546,416 B1 | 4/2003 | Kirsch |
| 6,592,627 B1 | 7/2003 | Agrawal et al. |
| 6,615,242 B1 | 9/2003 | Riemers |
| 6,618,747 B1 | 9/2003 | Flynn et al. |
| 6,633,855 B1 | 10/2003 | Auvenshine |
| 6,643,686 B1 | 11/2003 | Hall |
| 6,654,787 B1 | 11/2003 | Aronson et al. |
| 6,684,201 B1 | 1/2004 | Brill |
| 6,691,156 B1 | 2/2004 | Drummond et al. |
| 6,701,350 B1 | 3/2004 | Mitchell |
| 6,701,440 B1 | 3/2004 | Kim et al. |
| 6,704,772 B1 | 3/2004 | Ahmed et al. |
| 6,728,690 B1 | 4/2004 | Meek et al. |
| 6,732,149 B1 | 5/2004 | Kephart |
| 6,732,157 B1 | 5/2004 | Gordon et al. |
| 6,732,273 B1 | 5/2004 | Byers |
| 6,742,047 B1 | 5/2004 | Tso |
| 6,748,422 B2 | 6/2004 | Morin et al. |
| 6,751,348 B2 | 6/2004 | Buzuloiu et al. |
| 6,757,830 B1 | 6/2004 | Tarbotton et al. |
| 6,768,991 B2 | 7/2004 | Hearnden |
| 6,775,704 B1 | 8/2004 | Watson et al. |
| 6,779,021 B1 | 8/2004 | Bates et al. |
| 6,785,820 B1 | 8/2004 | Muttik et al. |
| 6,842,773 B1 | 1/2005 | Ralston et al. |
| 6,853,749 B2 | 2/2005 | Watanabe et al. |
| 6,868,498 B1 | 3/2005 | Katsikas |
| 6,892,193 B2 | 5/2005 | Bolle et al. |
| 6,901,398 B1 | 5/2005 | Horvitz et al. |
| 6,915,334 B1 | 7/2005 | Hall |
| 6,920,477 B2 | 7/2005 | Mitzenmacher |
| 6,928,465 B2 | 8/2005 | Earnest |
| 6,957,259 B1 | 10/2005 | Malik |
| 6,971,023 B1 | 11/2005 | Makinson et al. |
| 6,990,485 B2 | 1/2006 | Forman et al. |
| 7,003,555 B1 | 2/2006 | Jungck |
| 7,032,030 B1 | 4/2006 | Codignotto |
| 7,039,949 B2 | 5/2006 | Cartmell et al. |
| 7,051,077 B2 | 5/2006 | Lin |
| 7,072,942 B1 | 7/2006 | Maller |
| 7,089,241 B1 | 8/2006 | Alspector et al. |
| 7,117,358 B2 | 10/2006 | Bandini et al. |
| 7,146,402 B2 | 12/2006 | Kucherawy |
| 7,155,243 B2 | 12/2006 | Baldwin et al. |
| 7,155,484 B2 | 12/2006 | Malik |
| 7,188,369 B2 | 3/2007 | Ho et al. |
| 7,206,814 B2 * | 4/2007 | Kirsch ......................... 709/206 |
| 7,219,148 B2 | 5/2007 | Rounthwaite et al. |
| 7,249,162 B2 | 7/2007 | Rounthwaite et al. |
| 7,263,607 B2 | 8/2007 | Ingerman et al. |
| 7,287,060 B1 | 10/2007 | McCown et al. |
| 7,293,063 B1 | 11/2007 | Sobel |
| 7,320,020 B2 | 1/2008 | Chadwick et al. |
| 7,321,922 B2 | 1/2008 | Zheng et al. |
| 7,359,941 B2 | 4/2008 | Doan et al. |
| 7,366,761 B2 | 4/2008 | Murray et al. |
| 7,415,504 B2 * | 8/2008 | Schiavone et al. ............ 709/207 |
| 7,574,409 B2 | 8/2009 | Patinkin |
| 7,600,255 B1 | 10/2009 | Baugher |
| 7,617,284 B2 | 11/2009 | Salamuniccar |
| 7,711,779 B2 | 5/2010 | Goodman et al. |
| 7,739,162 B1 | 6/2010 | Pettay et al. |
| 7,904,517 B2 | 3/2011 | Kang et al. |
| 8,037,144 B2 * | 10/2011 | Lund et al. .................... 709/206 |
| 2001/0039575 A1 | 11/2001 | Freund et al. |
| 2001/0046307 A1 | 11/2001 | Wong |
| 2001/0049745 A1 | 12/2001 | Schoeffler |
| 2002/0016824 A1 | 2/2002 | Leeds |
| 2002/0016956 A1 | 2/2002 | Fawcett |
| 2002/0059425 A1 | 5/2002 | Belfiore et al. |
| 2002/0073157 A1 | 6/2002 | Newman et al. |
| 2002/0091738 A1 | 7/2002 | Rohrabaugh et al. |
| 2002/0116463 A1 | 8/2002 | Hart |
| 2002/0124025 A1 | 9/2002 | Janakiraman et al. |
| 2002/0129111 A1 | 9/2002 | Cooper |
| 2002/0147782 A1 | 10/2002 | Dimitrova et al. |
| 2002/0169954 A1 | 11/2002 | Bandini et al. |
| 2002/0174185 A1 | 11/2002 | Rawat et al. |
| 2002/0184315 A1 | 12/2002 | Earnest |
| 2002/0199095 A1 | 12/2002 | Bandini et al. |
| 2003/0009495 A1 | 1/2003 | Adjaoute |
| 2003/0009698 A1 | 1/2003 | Lindeman et al. |
| 2003/0016872 A1 | 1/2003 | Sun |
| 2003/0041126 A1 | 2/2003 | Buford et al. |
| 2003/0088627 A1 | 5/2003 | Rothwell et al. |
| 2003/0149733 A1 | 8/2003 | Capiel |
| 2003/0167311 A1 | 9/2003 | Kirsch |
| 2003/0191969 A1 | 10/2003 | Katsikas |
| 2003/0204569 A1 | 10/2003 | Andrews et al. |
| 2003/0229672 A1 | 12/2003 | Kohn |
| 2004/0003283 A1 | 1/2004 | Goodman et al. |
| 2004/0015554 A1 | 1/2004 | Wilson |
| 2004/0019650 A1 | 1/2004 | Auvenshine |
| 2004/0019651 A1 | 1/2004 | Andaker |
| 2004/0059697 A1 | 3/2004 | Forman |
| 2004/0068543 A1 | 4/2004 | Seifert |
| 2004/0073617 A1 | 4/2004 | Milliken et al. |
| 2004/0083270 A1 | 4/2004 | Heckerman et al. |
| 2004/0093371 A1 | 5/2004 | Burrows et al. |
| 2004/0139160 A1 | 7/2004 | Wallace et al. |
| 2004/0139165 A1 | 7/2004 | McMillan et al. |
| 2004/0148330 A1 | 7/2004 | Alspector et al. |
| 2004/0177120 A1 | 9/2004 | Kirsch |
| 2004/0181571 A1 | 9/2004 | Atkinson et al. |
| 2004/0193684 A1 | 9/2004 | Ben-Yoseph |
| 2004/0199585 A1 | 10/2004 | Wang |
| 2004/0199594 A1 | 10/2004 | Radatti et al. |
| 2004/0205135 A1 | 10/2004 | Hallam-Baker |
| 2004/0210640 A1 | 10/2004 | Chadwick et al. |
| 2004/0215977 A1 | 10/2004 | Goodman et al. |
| 2004/0255122 A1 | 12/2004 | Ingerman et al. |
| 2004/0260776 A1 * | 12/2004 | Starbuck et al. ............. 709/206 |
| 2005/0015455 A1 | 1/2005 | Liu |
| 2005/0015456 A1 | 1/2005 | Martinson, Jr. |
| 2005/0021649 A1 * | 1/2005 | Goodman et al. ............ 709/207 |
| 2005/0041789 A1 * | 2/2005 | Warren-Smith et al. ... 379/93.24 |
| 2005/0050150 A1 | 3/2005 | Dinkin |
| 2005/0060643 A1 | 3/2005 | Glass et al. |
| 2005/0076084 A1 | 4/2005 | Loughmiller et al. |
| 2005/0080855 A1 | 4/2005 | Murray |
| 2005/0080889 A1 | 4/2005 | Malik et al. |
| 2005/0081059 A1 | 4/2005 | Bandini et al. |
| 2005/0091320 A1 * | 4/2005 | Kirsch et al. ................. 709/206 |
| 2005/0091321 A1 | 4/2005 | Daniell et al. |
| 2005/0097174 A1 | 5/2005 | Daniell |
| 2005/0102366 A1 | 5/2005 | Kirsch |
| 2005/0108340 A1 | 5/2005 | Gleeson et al. |
| 2005/0114452 A1 | 5/2005 | Prakash |
| 2005/0120019 A1 | 6/2005 | Rigoutsos et al. |
| 2005/0159136 A1 | 7/2005 | Rouse et al. |

| | | |
|---|---|---|
| 2005/0160148 A1 | 7/2005 | Yu |
| 2005/0165895 A1 | 7/2005 | Rajan et al. |
| 2005/0182735 A1 | 8/2005 | Zager et al. |
| 2005/0188023 A1 | 8/2005 | Doan et al. |
| 2005/0198270 A1* | 9/2005 | Rusche et al. ............... 709/224 |
| 2005/0204005 A1 | 9/2005 | Purcell et al. |
| 2005/0204006 A1 | 9/2005 | Purcell et al. |
| 2005/0204159 A1 | 9/2005 | Davis et al. |
| 2005/0228899 A1 | 10/2005 | Wendkos et al. |
| 2006/0015942 A1* | 1/2006 | Judge et al. ..................... 726/24 |
| 2006/0026246 A1 | 2/2006 | Fukuhara et al. |
| 2006/0031303 A1 | 2/2006 | Pang |
| 2006/0031306 A1 | 2/2006 | Haverkos |
| 2006/0031464 A1* | 2/2006 | Bowman et al. ............. 709/224 |
| 2006/0036693 A1 | 2/2006 | Hulten et al. |
| 2006/0036701 A1 | 2/2006 | Bulfer et al. |
| 2006/0041505 A1 | 2/2006 | Enyart |
| 2006/0047769 A1* | 3/2006 | Davis et al. .................. 709/207 |
| 2006/0059238 A1* | 3/2006 | Slater et al. .................. 709/206 |
| 2006/0123083 A1 | 6/2006 | Goutte et al. |
| 2006/0137009 A1* | 6/2006 | Chesla ........................... 726/22 |
| 2006/0168017 A1* | 7/2006 | Stern et al. ................... 709/206 |
| 2006/0265498 A1 | 11/2006 | Turgeman et al. |
| 2007/0050461 A1* | 3/2007 | Petry et al. ................... 709/206 |
| 2007/0101423 A1 | 5/2007 | Oliver et al. |
| 2007/0118759 A1* | 5/2007 | Sheppard ..................... 713/188 |
| 2007/0130350 A1 | 6/2007 | Alperovitch et al. |
| 2007/0130351 A1 | 6/2007 | Alperovitch et al. |
| 2007/0133034 A1 | 6/2007 | Jindal et al. |
| 2007/0143407 A1 | 6/2007 | Avritch et al. |
| 2007/0208856 A1 | 9/2007 | Rounthwaite et al. |
| 2008/0016579 A1 | 1/2008 | Pang |
| 2008/0104186 A1 | 5/2008 | Wieneke et al. |
| 2008/0114843 A1* | 5/2008 | Shinde et al. ................ 709/206 |
| 2008/0120413 A1* | 5/2008 | Mody et al. .................. 709/226 |
| 2009/0157708 A1* | 6/2009 | Bandini et al. ............... 707/100 |

FOREIGN PATENT DOCUMENTS

| | | |
|---|---|---|
| EP | 0413537 (A2) | 2/1991 |
| EP | 0413537(A2) | 2/1991 |
| EP | 720333 | 7/1996 |
| EP | 0813162 | 12/1997 |
| EP | 1300997 | 4/2003 |
| EP | 1376427 | 1/2004 |
| EP | 1376427 (A2) | 1/2004 |
| JP | 10074172 (A) | 3/1998 |
| JP | 2000163341 (A) | 6/2000 |
| JP | 2001505371 | 4/2001 |
| JP | 2001505371 A | 4/2001 |
| JP | 2002149611 (1) | 5/2002 |
| JP | 2002164887 (A) | 6/2002 |
| JP | 2002330175 A | 11/2002 |
| JP | 2002537727 | 11/2002 |
| JP | 2002537727 A | 11/2002 |
| JP | 2003115925 (A) | 4/2003 |
| JP | 2003125005 A | 4/2003 |
| JP | 2004186888 (A) | 7/2004 |
| KR | 20010088973 (A) | 9/2001 |
| KR | 20020063534 (A) | 8/2002 |
| TW | 519591 | 2/2003 |
| TW | 520483 | 2/2003 |
| TW | 521213 | 2/2003 |
| WO | 9635994 A1 | 11/1996 |
| WO | WO9635994 (A1) | 11/1996 |
| WO | WO9910817 (A1) | 3/1999 |
| WO | WO9937066 (A1) | 7/1999 |
| WO | WO9967731 | 12/1999 |
| WO | WO0146872 (A1) | 6/2001 |
| WO | WO0219069 (A2) | 3/2002 |
| WO | WO0223390 (A2) | 3/2002 |
| WO | WO0230054 A1) | 4/2002 |
| WO | WO02071286 | 9/2002 |
| WO | WO02071286 (A2) | 9/2002 |
| WO | WO02082226 (A2) | 10/2002 |
| WO | WO03054764 | 7/2003 |
| WO | WO2004054188 | 6/2004 |
| WO | WO2004059206 | 7/2004 |
| WO | WO2004059506 (A1) | 7/2004 |

OTHER PUBLICATIONS

Androutsppoulos, et al., "An Experimental Cmparison of Naive Bayesain and Keywork-Based Anti-Spam Filtering with Personal E-mail Messges", Proceedings of the 23rd ACM SIGIR Conference, pp. 160-167, 2000.

Androutsopoulos, Learning to Filter Spam E-Mail: A Comparison of a Naive Bayesian and a Memory-Based Approach; 4th PKDD's Workshop on Machine Learning and Textual Information Access, 20003 13 pages.

Argamon, et al., "Routing documents according to style"; In First International Workshop on Innovative Information Systems, 1998. 8 pages.

Balter, et al., "Bifrost lnbox Organizer: Giving users control over the inbox"; NordiCHI Oct. 2, 2002, pp. 111-118, Arhus, Denmark.

Bowman, "Hotmail Spam Filters Block Outgoing E-mail"; CNET News.com, Jan. 18, 2001. 3 pages.

Breiman, et al., "Classification and Regression Trees"; Wadsworth & Brooks, Monterey, CA (1984).

Broder, et al., "Syntactic Clustering of the Web" SRC Technical note, Digital Corporation, Jul. 25, 1997. 13 pages.

Byrne, "My Spambook: Was Thwarting UCE Address Culling Programs"; Newsgroups: news.admin.net-abuse.email.comp.mail.sendmail, comp.security.unix; Jan. 19, 1997.

"Clearswift Announces the Most Complete e-Policy-Based Email Content Security Product for Service Providers"; http://www.clearswift.com/news/item.aspx?ID=144. (Oct. 12, 2002).

Cohen, "Learning Rules that Classify E-Mail", In the proceedings of the 1996 AAAI Spring Symposium on Machine Learning in information Access. Downloaded from William Cohen's web page: http:www.research.att.com/ncohen/pubs.html.

Cranor, et al., "Spam!" Communications of the ACM, 1998, pp. 74-83, vol. 41. No. 8.

Cunningham, et al., "A Case-Based Approach to Spam Filtering that Can Track Concept Drift" Trinity College, Dublin, Department of Computer Science, May 13, 2003.

Dwork, et al., "Pricing via Processing or Combatting Junk Mail*"; Prsented at Crypto '92; pp. 1-11.

Fawcett, ""In vivo" spam filtering: A challenge problem for KDD"; SIGKDD Explorations, Dec. 2003. pp. 140-148, vol. 5 Issue 2, ACM.

Federal Trade Commission, "False Claims in Spam"; A report by the FTC's division of marketing practices, Apr. 30, 2003, http://www.ftc.gov/reports/spam/030429spamreport.pdf.

Gee, "Using Latent Semantic Indexing to Filter Spam" Dept. of Computer Science and Engineering, University of Texas-Arlington. 5 pages. Proceedings of the 2003 ACM symposium on Applied Computing. 2003—portal.acm.org.

Graham, "A Plan for Spam, Online!" Aug. 2002, XP002273602, http://www.paulgraham.com/spam.html, retrieved on Mar. 12, 2004.

Graham, "The Future of Spam", Computer Security Journal, CSI Computer Security Institute, vol. XIX, No. 1, Jan. 2003, pp. 1-5.

Hansell, "Internet Is Losing Ground in Battle Against Spam"; the New York Times: Technology section, Apr. 22, 2003.

Hayes, "Spam, Spam, Spam, Lovely Spam"; American Scientist Online, Jun. 30, 2003. pp. 1-6. vol. 91.

Hidalgo, "Evaluating Cost-Sensitive Unsolicited Bulk Email Categorization"; SAC 2002, pp. 615-620, ACM Madrid, Spain.

lwayama, et al., "Hierarchical Bayesian Clustering for Automatic Text Classification" Natureal Language; 1995; pp. 1322-1327.

Joachims, "Text Categorization with Support Vector Machines: Learning with Many Relevant Features", LS-8 Report 23, Nov. 1997, 18 pages.

Joachims, "Transductive Inference for Text Classification using Support Vector Machines", In Proceedings of the 16th International Conference on Machine Learning, 1999. pp. 200-209. Sabn Francisico, USA.

Knowles, et al. "Stop, in the Name of Spam". Communications of the ACM, Nov. 1998, pp. 11-14, vol. 41 No. 11, ACM.

Koller, et al., "Hierarchically classifying documents using very few words"; In ICML-97: Proceedings of the Fourteenth International Conference on Machine Learning; San Francisco, CA; Morgan Kaufmann 1997; 9 pages.

Lewis, "Representation and learning in information retrieval" University of Massachusetts, 1992.

Lewis, et al., "A Comparison of Two Learning Algorithms for Text Categorization", Third Annual Symposium on Document Analysis and Information Retrieval; Apr. 11-13, 1994; pp. 81-93.

Lewis, "An Evaluation of Phrasal and Clustered Representations on a Text Categorization Task"; 15th Annual International SIGIR '92; Denmark 1992; pp. 37-50.

Li, et al., "Classificaton of Text Documenst", Department of Computer Science and Engineering, Michigan State University, E. Lansing, Michigan, The Computer Journal, vol. 41, No. 8, 1998; 537-546.

Li, et al., "Secure Human-Computer Identification against Peeping Attacks (SecHCI): A Survey"; Technical Report, Microsoft Research, 2003. 53 pages.

Madigan, "Statistics and The War on Spam", Rutgers University, pp. 1-13, 2003.

Manco, et al., "Towards An Adaptive Mail Classifier"; In Proceedings of Italian Association for Artificial Intelligence Workshop, 2002. 12 pages.

Massey, et al., "Learning Spam: Simple Techniques for Freely-Available Software"; Proceedings of Freenix Track 2003 Usenix Annual Technical Conference, Online!, Jun. 9, 2003, pp. 63-76, Berkley CA USA.

"MIME", The Microsoft Computer Dictionary, 5th ed. Redmond, WA; Microsoft Press. May 1, 2002.

Mimoso, "Quick Takes: Imagine Analysis, Filtering Comes to E-mail Security", http://searchsecurity.techtarget.com/originalContent.html (Feb. 5, 2002).

Mitchell, "Machine Learning", Carnegie Mellon Universy, Bayesian Learning, Chapter 6, pp. 180-184, The McGraw-Hill Companies, Inc. cc 1997.

Mock, "An Experimental Framework for Email Categorization and Management" Proceedings of the 24th Annual International ACM SIGIR Conference, pp. 292-293. 2001.

O'Brien, et al., "Spam Filters: Bayes vs. Chi-squared; Letters vs Words" Proceedings of the 1st international symposium on Information and communication technologies, 2003, pp. 291-296, Dublin, Ireland.

Palme, et al., "Issues when designing filters in messaging systems", Department of Computer and Systems Sciences, Stockholm University, Royal institute of Technology, Skeppargarten 73, S-115 30, Stockholm, Sweden, Computer Communications; 1996; 99. 95-101.

Pantel, et al., "Spam Cop: A Spam Classification & Organization Program"; In Proceedings AAAI-1998 Workshop on Learning for Text Categorization, 1998. 8 pages.

Quinlan, "C4.5: Programs for Machine Learning"; Morgan Kaufmann, San Francisco, CA (1993).

Rennie, "ifile: An Application of Machine Learning to E-Mail Filtering"; Proceedings of the KDD-2000 Workshop on Text Mining, Sixth ACM SIGKDD International Conference on Knowledge Discovery and Data Mining, 2000. 6 pages.

Rosen, "E-mail Classification in the Haystack Framework" Massachusetts Institute of Technology, Feb. 2003.

Sahami, et al., "A Bayesian Approach to Filtering Junk E-Mail" Sanford University, http://citeseerx.ist.psu.edu/viewdoc/summary?doi=10.1.1.48.1254, 1998.

Sahami, "Learning Limited Dependence Bayesian Classifiers" in KDD-96: Proceedings of the Second International Conference on Knowledge Discovery and Data Mining, AAAI Presss, 1996, Menlo Park, CA, pp. 335-338.

Schutze, et al., "A Comparison of Classifiers and Document Representations for the Routing Problem", Proceedings of the 18th Annual International ACM SIGIR Conference on Research and Development in Information Retrieval, Seattle, WA Jul. 9-13, 1995; pp. 229-237.

Sebastiani, "Machine Learning in Automated Text Categorization"; ACM Computing Surveys, vol. 34 Issue 1, pp. 1-47, 2002.

Segal, et al., "SwiftFile: An Intelligent Assistant for Organizing E-Mail", IBM Thomas J. Watson Reseach Center. Copyright 2000, American Association for Artificial Intelligence (www.aaal.org.

Simard, et al., Using Character Recognition and Segmentation to Tell Computer from Humans', International Conference on Document Analysis and Recognition (ICDAR), IEE Computer Society. Los Alamitos, pp. 418-423, 2003.

Skoll, "How to Make Sure a Human is Sending You Mail", Newsgroups: news.admin.net-abuse.usenet. Nov. 17, 1996.

Spertus, "Smokey: Automatic Recognition of Hostile Messages" Proceedings of the Conference on Innovative Applications in Artificial Intelligence (IAAI), 1997, 8 pages.

Takkinen, et al., "CAFE: A Conceptual Model for Managing Information in Electronic Mail", Laboratory for Intelligent Infomation Systems, Department of Computer and Information Science, Linkoping University, Sweden, Conference on System Sciences, 1998 IEEE.

Turner, et al., "Controlling Spam through Lightweight Currency"; In Proceedings of the Hawaii International Conference on Computer Sciences, Jan. 2004. 9 pages.

Turner, et al , "Payment-Based Email"; 5th International Conference on Software Engineering, Artificial Intelligence, Networking, and Parallel/Distributed Computing, Jun. 2004. 7 pages.

Wong, "Preventing Spams and Relays" Linux Journal, Dec. 1998, 6 pages, vol. 1998 Issue 56es, Specialized Systems Consultants, Inc.

Wong, "SPF Overview"; Linus Journal, Apr. 2004, 6 pages, vol. 2004 Issue 120, Specialized Systems Consultants, Inc.

Wu, et al., "A new anti-Spam filter based on data mining and analysis of email security"; Conference Proceedings of the SPIE, Data Mining and Knowledge Discovery Theory, Tools and Technology V, vol. 5098, Apr. 21, 2003, pp. 147-154, Orlando FL USA.

Yang, et al., "A Comparative Study on Feature Selection in Text Categorization" School of Computer Science, Carnegie Melton University, Pittsburgh, PA and Verity, Inc., Sunnyvale, CA; http://citeseerx.ist.psu.edu/viewdoc/summary?doi=10.1.1.32.9956; 1997; 9 pages.

Yang, et al., "An Example-Based Mapping Method for Text Categorization and Retrieval"; ACM Transactions on Information Systems, vol. 12, No. 3, Jul. 1994, pp. 252-277.

European Search Report dated Apr. 6, 2006 and mailed Apr. 6, 2006 for EP 04102242, 3 pages.

European Search Report, dated Jun. 9, 2005, mailed Aug. 22, 2005 for European Patent Application Serial No. EP04011978, 12 pages.

European Search Report, EP31087TE900, mailed Nov. 11, 2004.

International Search Report dated Jan. 17, 2006, mailed Jan. 31, 2006, for PCT Application Serial No. PCT/US04/05501, 2 pages.

International Search Report, EP 03 00 6814, mailed Feb. 13, 2004.

OA dated Jan. 16, 2009 for U.S. Appl. No. 10/917,077, 34 pages.

OA dated Nov. 28, 2008 for U.S. Appl. No. 10/799,455, 53 pages.

OA dated Nov. 6, 2008 for U.S. Appl. No. 10/799,992, 46 pages.

OA dated Oct. 8, 2008 for U.S. Appl. No. 11/743,466, 43 pages.

Stop, in the Name of Spam, Communications of the ACM, Nov. 1998, pp. 11-14, vol. 41 No. 11, ACM.

How to Obscure Any URL, http:www.pc-help.org/obscure.htm, last viewed on Jan. 18, 2003, 10 pages.

Kohavi, "A study of cross-validation and bootstrap accuracy estimation and model selection", Proceedings of the Fourteenth International Joint Conference on Artificial Intelligence 2 (12), retrieved from <<http://dli.iiit.ac.in/ijcai/IJCAI-95-VOL2/PDF/016/pdf>>, 1995, pp. 1137-1143.

Canadian Office Action mailed May 31, 2011 for Canadian Patent Application No. 2513967, a counterpart foreign application of US Patent No. 7,219,148.

"Camram Postage Stamp Basics", Internet Citation, Jun. 9, 2002, 17 pages.

Chinese Office Action mailed May 25, 2011 for Chinese patent application No. 200510107384.8, a counterpart foreign application of US patent No. 7,603,422.

"Sender ID Framework Overview", retrieved from <<http://www.microsoft.com/mscorp.twc/privacy/spam/senderid/overview.mspx>> on Dec. 17, 2004, published Sep. 30, 2004.

"Sender ID: Two Protocols, Divided by a Common Syntax", retrieved from <<http://spf.pobox.com/senderid.html>> on Dec. 17, 2004, 2 pages.

"SPF: Sender Policy Framework", retrieved from <<http://spf.pobox.com>> on Dec. 17, 2004, Copyright IC Group, Inc., 2004, 1 page.

"The Coordinated Spam Reduction Initiative", Microsoft Corporation, Feb. 13, 2004, pp. 1-54.

Israel Office Action mailed Jan. 26, 2011 for Israeli Patent Application No. 206121, a counterpart foreign application of US Patent No. 7,558,832.

K. Mock. An Experimental Framework for Email Categorization and Management. Proceedings of the 24th Annual International ACM SIGIR Conference, pp. 392-393, 2001.

Skoll, David, How to Make Sure a Human is Sending You Mail, Newsgroup Citation, Online, Nov. 17, 1997, XP002267504, news.admin.net-abuse.usenet, http://groups.google.ca/groups.

EP Office Action mailed Nov. 3, 2011 for European patent application No. 04011978.6, a counterpart foreign application of US patent No. 7,711,779, 5 pages.

Supplementary European Search Report mailed Nov. 7, 2011 for European patent application No. 04714607.1, 5 pages.

Korean Office Action mailed Jul. 29, 2011 (and English translation dated Aug. 31, 2011) for Korean patent application No. 10-2004-36149, a counterpart foreign application of US patent No. 7,711,779, 6 pages.

Japanese Office Action for JP Application No. 2003-148320, mailed on Sep. 26, 2008, 7 pages.

Kawamata, et al., "Internet Use Limitation, Started by Company, Part II. Full Monitoring/Limiting Software, " NIKKEI Computer, No. 469, Nikkei Business Publications, Inc, May 10, 1999, pp. 87-91.

Partial European Search Report, EP05100847, mailed Jun. 21, 2005, 5 pages.

Translated and redacted copy of the Russian Decision of Grant for RU Application No. 2003115902 dated Sep. 10, 2009, 7 pages.

Shimmin, B.F., "Effective use of electronic post", FENIX Publishing House, Rostov-na-Donu, 1998, pp. 229-249.

Written Opinion of the International Preliminary Examining Authority mailed Nov. 30, 2005 for PCT/US03/41526, 5 pages.

* cited by examiner

SPAM FILTRATION UTILIZING SENDER ACTIVITY DATA

BACKGROUND

The advent of global communications networks such as the Internet has presented commercial opportunities for reaching vast numbers of potential customers. Electronic messaging, and particularly electronic mail ("email"), is becoming increasingly pervasive as a means for disseminating unsolicited, undesired bulk messages to network users (also denoted as "spam") including advertisements and promotions, for example.

Despite many efforts with respect to reduction and prevention, spam continues to be a major problem. According to industry estimates today, billions of email messages are sent each day and over seventy percent are classified as spam. Individuals and entities (e.g., businesses, government agencies) are becoming increasingly inconvenienced and oftentimes offended by junk messages. Furthermore, spam is forcing businesses to pay enormous amounts (billions of dollars worldwide) for internal messaging infrastructure and support staff. As such, spam is becoming a major threat to trustworthy computing and electronic messaging.

A significant technique utilized to thwart spam is employment of filtering systems/methodologies. One proven filtering technique is based upon a machine learning approach. More particularly, machine learning filters are employed to assign a probability to an incoming message indicative of whether the message is spam or non-spam. Conventionally, pre-classified messages are utilized to train a filter to discriminate probabilistically between message types. For example, a group of users can be polled to facilitate labeling of messages as spam or non-spam. Once trained the filter or associated learning model can be employed to classify messages.

There are two main types of filters utilized, namely content-based filters and internet protocol (IP) address-based filters. As the name suggests, content-based filters are trained to analyze message content or text such as words and phrases in the subject and/or body of a message to facilitate identification of spam. IP address-based filters learn about addresses associated with messages with respect to a set of training data. Subsequently during classification, the filter extracts an IP address from a message and infers whether it is spam.

Unfortunately, spammers have adapted to the onslaught of spam filtering techniques by finding ways to disguise their identities to avoid and/or bypass spam filters. Thus, conventional content-based and IP address-based filters are becoming ineffective in recognizing and blocking disguised spam messages. Moreover, simply training such spam filters to be more aggressive is not an adequate solution as this technique results is a higher volume of false positives, where legitimate messages are labeled as spam.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, improved spam detection systems and methods are disclosed. In particular, message sender reputation is utilized to facilitate classification of messages or like items as spam or non-spam. Reputation can be derived from historical activity data about senders generated either by the senders themselves and/or others, among other things. Activity data can be captured as counts or occurrences aggregated across at least one time period to facilitate incorporation into a filter and afford robustness, respectively.

In accordance with an aspect of the disclosure, a spam detection system that employs a sender filter is provided. The system receives messages and utilizes a sender filter that incorporates sender activity data to classify messages. The sender of the message is identified and activity data associated with the identity is collected. A spam verdict is output by the sender filter based at least in part on the activity data. The sender filter can also be utilized in conjunction with other filters including a context filter to improve filter performance further.

According to another aspect, the disclosure provides a method for training a filter to identity spam. More specifically, a corpus of training messages classified as spam and non-spam is collected. For each message, a sender is identified. Activity data is collected about all identified senders as counts and aggregated over at least one time period. The training data and the activity data can then be used to train the filter and/or associated learning model.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

The subject disclosure pertains to systems and methods for improved spam detection. More particularly, spam is identified based on computing a sender reputation utilizing a model derived from volume and/or activity data across a myriad of senders. This model incorporates aggregated historical counts for various categories such as volume of messages sent and/or returned, number of distinct hours sending and/or number for junk message reports, among other things. This provides for prediction of sender reputation given secondary information rather than relying solely on sender identity as captured by an IP address, for instance. Further yet, such a filter can be employed in conjunction with a typical text or content based filter to dramatically reduce the false-negative rate of spam detection.

Various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
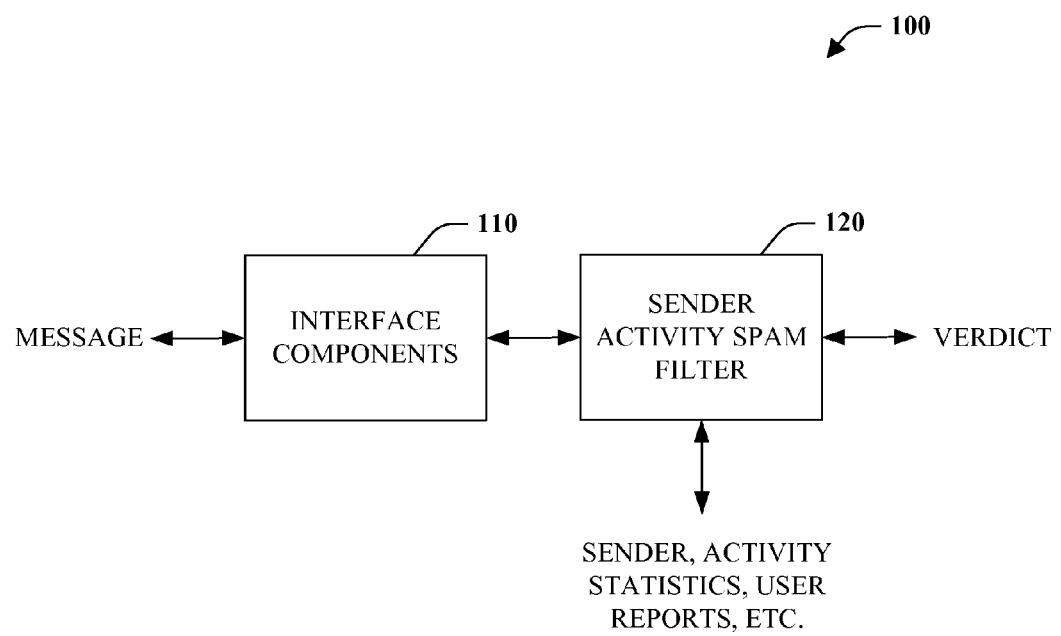
FIG. 1 is a block diagram of spam detection system.

Referring initially to FIG. 1, a spam detection system 100 is illustrated in accordance with an aspect of this disclosure. System 100 can classify messages with respect to the likelihood of being spam. Interface component 110 receives, retrieves or otherwise obtains or acquires messages or other like items for classification. For example, messages can correspond to electronic messages or email, among other things. Upon acquisition, the interface component 110 can transmit or otherwise make accessible one or more messages to sender activity spam filter component 120.

The filter component 120 can evaluate a message with respect to a sender and a variety of secondary information associated therewith. A sender can be identified via an email address, domain, IP address or IP address range, inter alia. Secondary information may include sender activity data such as the volume of the sender as measured on either a per message or per recipient basis, volume of mail from the sender that bounces, volume of mail from the sender that arrives in a trap account, volume of mail from the sender tagged as spam by another filter, time when mail arrived from a sender and/or user-reported data (e.g., junk mail, false positives) associated with the sender, among others. Such activity data can be embodied as raw data, encapsulated in a learning model, rules and/or the like. In any event, the sender activity filter component 120 can employ such data to produce a verdict regarding a message or other like item provided for evaluation. The verdict may be a probability that a message may be spam or non-spam and/or a finite determination thereof based on a threshold value. Employment of activity data in combination with a sender identity captured by an IP address or range thereof, for instance, enables more intelligent and adaptive message classification.

Figure 2:
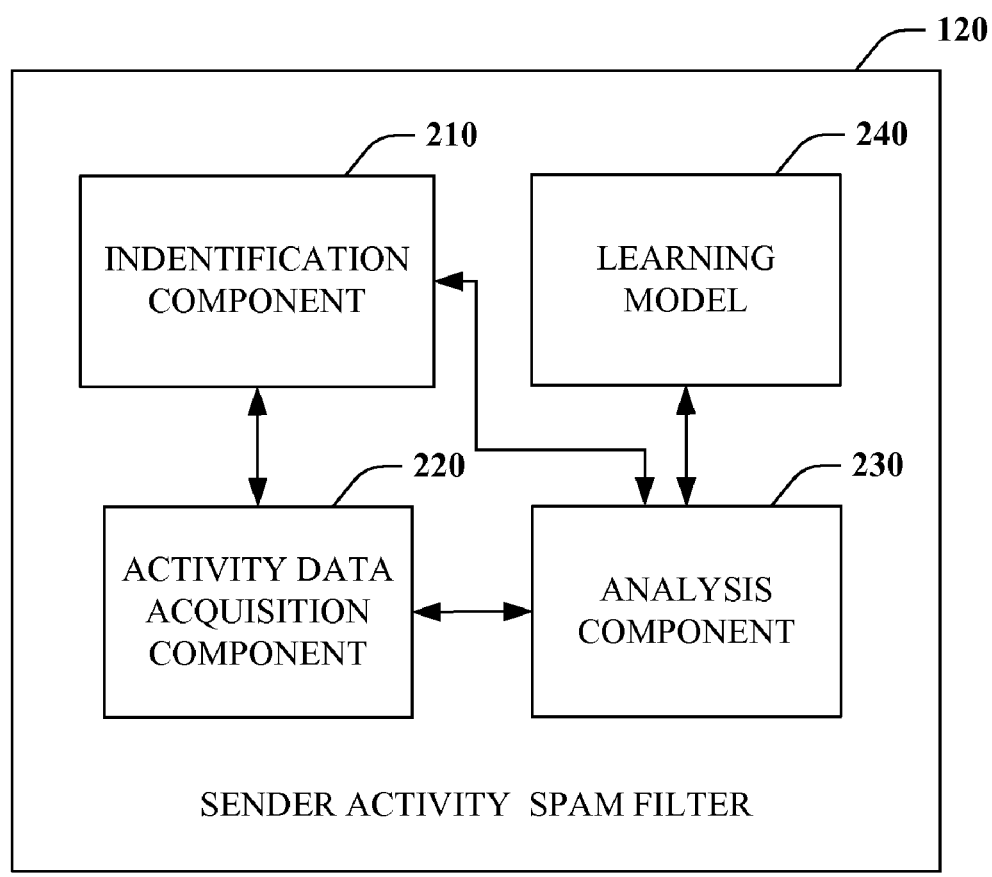
FIG. 2 is a block diagram of a sender activity filter component.

FIG. 2 depicts a sender activity filter component 120 in accordance with an aspect of the disclosure. The sender activity filter component 120 is operable to produce a verdict as to whether a message is likely spam or not derived from the message sender and data associated with the sender. Identification component 210 provides a mechanism to determine a sender identity associated with a message. For example, this could be an email address, a domain name or an IP address, among other things. Acquisition component 220 receives or retrieves activity data for the sender identified by the identification component 210 (e.g., number of messages sent, bounced, user reports . . . ). Both the sender identity and the relevant activity data are provided to the analysis component 230, which can interact with the learning model component 240. More particularly, one or both of the sender identity and activity data can be provided to the learning model component 240. The combination of analysis component 230 and learning model component 240 can associate a likelihood that a message is spam based on a determined sender reputation, as determined from identity and activity. The likelihood can be expressed as a score, weight or probability that a message is spam as a function of aggregate activity data. The value returned by the analysis component 230 can be the probability that message is spam and/or a binary answer based on a threshold.

Figure 3:
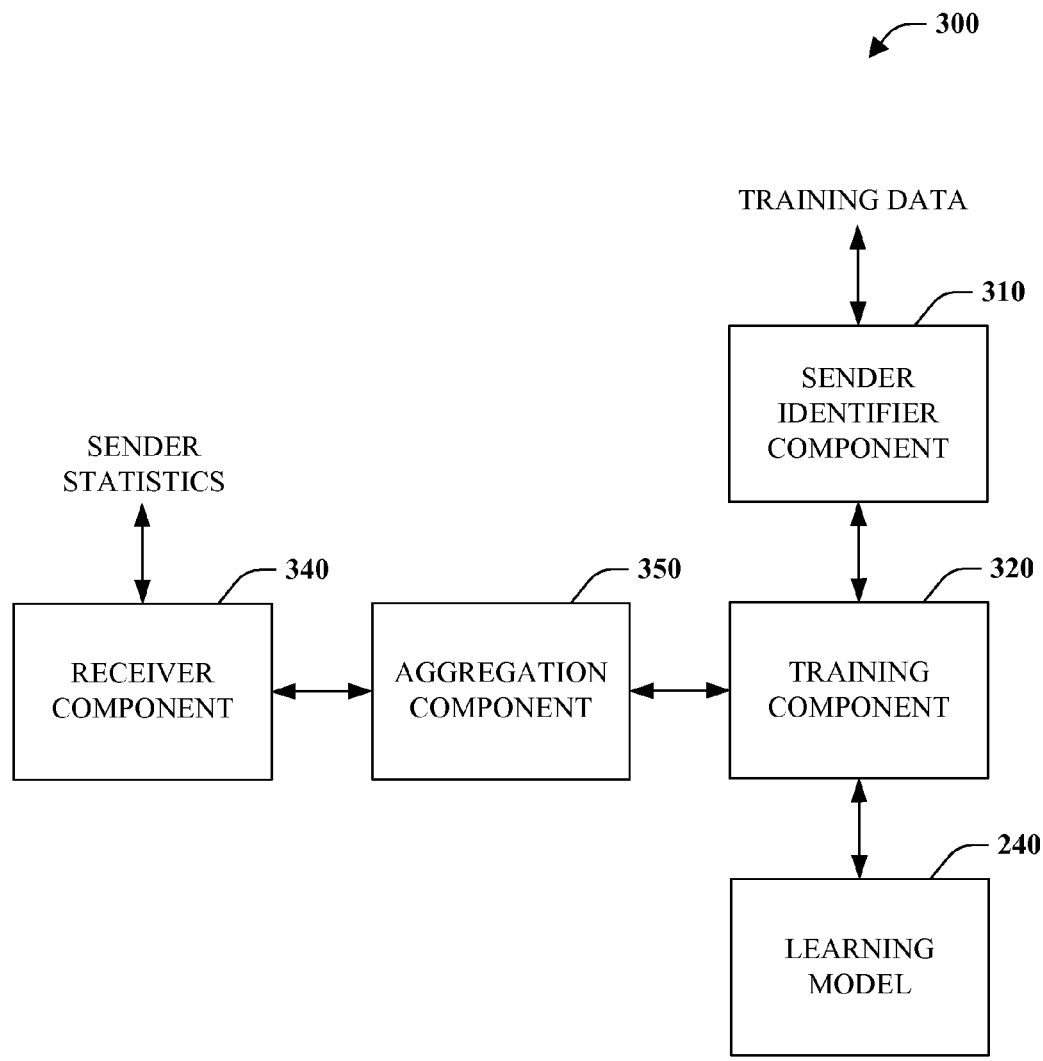
FIG. 3 is a block diagram of a system to facilitate sender filter generation.

FIG. 3 depicts a system 300 that facilitates sender activity filter generation in accordance with an aspect of the disclosure. Sender identifier component 310 receives or retrieves training data. The training data can include messages tagged as either spam or non-spam. In one instance, the training data can be a result of direct user polling. For example, numerous messaging users can be selected at random periodically, provided with messages they may have received, and asked to classify the messages. The identifier component 310 can extract a sender identity from messages. A sender can be identified by email address, domain name, IP address or range of IP addresses. Subsequently, the sender identifier component 310 can provide the sender identity and message classification to training component 320.

Training component 320 provides a mechanism to train a learning model 240. The sender activity filter component 120 of FIGS. 1 and 2 can employ the learning model 230 to intelligently classify messages as good or spam. The learning model component 240 can therefore correspond to any machine learning, artificial intelligence, statistic or rule based system, inter alia, that can be trained to enable reasoning about whether messages are spam or non-spam. In one embodiment, the learning model 240 can form part of the sender activity filter component 120, for instance as a main component or subcomponent as shown in FIG. 2. Alternatively, the learning model 230 can be separate, but accessible by sender filter 120. Furthermore, it is to be noted that the collection of components 310, 320 and 240 may form at least part of a conventional IP address-based filter training system, where sender reputation is solely a function of the goodness of messages sent thereby as tagged via one or more trustworthy sources (e.g., user polls).

Receiver component 340 is operable to facilitate provisioning of data to aggregation component 350. The receiver component 340 receives, retrieves or otherwise obtains sender statistics or activity data, for example from a data store and/or service. Such activity data can correspond to any messaging or message related action or information. For example, the receiver component 340 can collect data relating to sending volume, bounced messages, messages arriving in a trap account (a.k.a, honey pot), messages tagged as spam by other filters, message time (e.g., sent, received . . . ), junk message and/or false positives (good message caught as spam) user reports, among others. Such information may be captured and persisted by a messaging program such as an email program. Note that the receiver component 340 need not obtain all persisted data. In fact, component 240 can be designed and/or programmed to be selective such that it only acquires data regarding only specific activities or sets of metrics. Furthermore, available activity data can be dependent upon a messaging system and/or the collection capabilities thereof.

Figure 4:
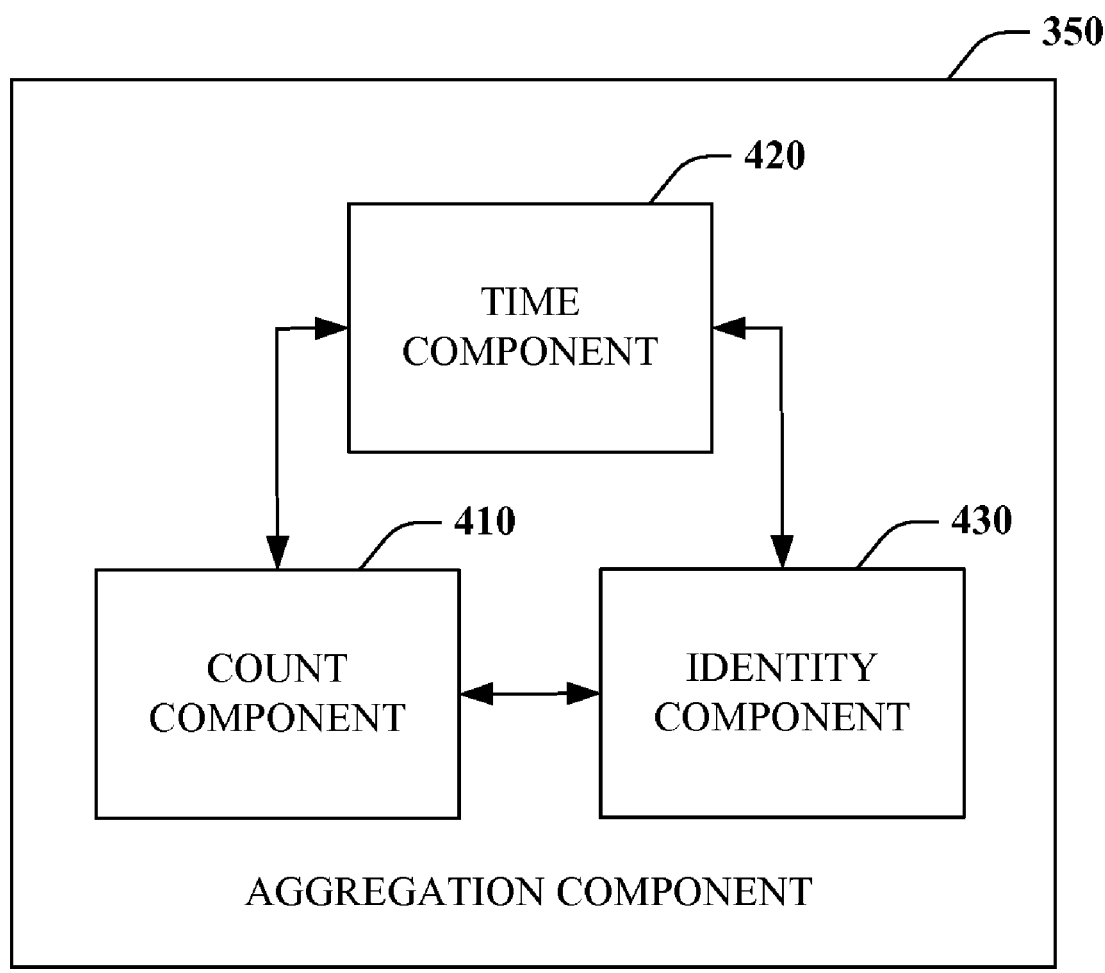
FIG. 4 is a block diagram of an aggregation component.

Upon receipt or acquisition of activity data, the aggregation component 350 can perform aggregation functions upon such data. Data can thus be aggregated in various manners per sender (or group of senders) prior to employment by communicatively coupled training component 320. Referring briefly to FIG. 4, the aggregation component 350 is depicted in further detail in accordance with an aspect of the disclosure. In particular, the aggregation component 350 may include count component 410, time component 420 and identity component 430 communicatively coupled to facilitate cooperation amongst the components.

The count component 410 provides a mechanism for converting activity data into counts or number of occurrences. For example, if a sender sent five messages throughout a day, a sent message count associated with the sender could be set or otherwise incremented to five. Count component 410 can be considered a formatting component and, as such, it can reside elsewhere in the training system 300 of FIG. 3. Furthermore, the component 410 may be removed from the system altogether if data is captured in count format by another component or service (e.g., third-party).

For purposes of clarity and understanding, consider a conventional email system as an example. For purpose of optimization and overall effectiveness, the receiver component 340 alone or in conjunction with the aggregation component 350 of FIG. 3 can be designed to obtain and/or compute select activity metrics tagged as DistinctHours, nData, nDataRcpt, nRcpt, nRcptNDR and JMR.

DistinctHours provides the number of distinct or particular hours an IP address had some traffic. For example, if an IP address sends ten messages at 1:00 a.m. and ten messages at 2:00 p.m. and does not send any more messages that day, the counter can be incremented by two corresponding to the two distinct hours of traffic. It turns out that spammers try to get their mail through as quickly as possible before they are blocked. Hence, a spammer might send for a few hours, whereas a good sender might send mail more evenly across an entire day.

nData represents the number of times an IP address issued the DATA or BDAT SMTP command. SMTP stands for simple mail transport protocol and is the protocol utilized by email servers to talk to each other. One of the first things a sender does in this protocol is to specify to whom an email is to be sent. Some spammers will try to determine if an address is good by sending a mail to command to observe if they receive an error message. In fact, a sender may never even proceed to the DATA command to actually send an email message. Accordingly, if an IP address is performing a lot of connections but not actually sending mail very often that would be a sign of a dictionary attack. nData measures the number of times an IP address actually uses the DATA command to send email as opposed to other commands that might be employed to check the validity of an email address.

Similar to nData, nDataRcpt measures the number of times an IP address issued the DATA or BDAT SMTP command multiplied by the number of recipients. Typically, spammers send a higher volume of email than regular users. This metric aids measurement of total volume of email sent. For example, if a message is addressed to two recipients and actually sent utilizing the DATA command, the value of nDataRcpt would be two.

nRcpt identifies the number of times a user tried to send mail via RCPT commands. A variation thereon is nRcptNDR where NDR stands for nondeliver receipt. The value is simply the number of recipients on a message from a sender where the message was an NDR. This is essentially measuring bounced messages, which can facilitate identification of spam.

Another activity measure is JMR, which stands for junk mail report. A junk mail report corresponds to a user identifying a message as junk or spam. For example a user selects a button to report the message as junk and/or move the message to a junk mail folder.

The time component 420 is operable to aggregate activity counts over at least one time period. Such aggregation can enable spam detection to be time sensitive, which can prevent improperly blacklisting a sender based on incomplete and/or insufficient history, inter alia. By way of example, consider a scenario in which a sender initially is associated with good behavior and then some bad behavior is added. For instance, clean behavior may be linked to a sender with low volume message emission with no junk mail reports and zero bounces. Subsequently, a few or many junk mail reports and bounces may be noted. By aggregating over multiple time periods, the spam filter can be designed to be robust such that small amounts of bad behavior have only a short term and proportionate impact. Otherwise, a sender may be blacklisted based on a small amount of bad behavior, which would be problematic.

The identity component 430 is a mechanism for aggregation of sender identities or potential identities thereof. In other words, activity data can be collected and/or associated with multiple identities. For example, activity data can be collected for a range of IP addresses or across a shared domain. Where properly aggregated, information can be revealed about identities that do not otherwise have data associated therewith. Furthermore, communicatively coupled count and time components 410 and 420, respectively, can enable count data to be aggregated across multiple time periods and associated with a particular group of identities.

Returning to FIG. 3, aggregated data can be provided to training component 320 via aggregation component 350. The training component 320 can thus employ this data in conjunction with the training data to train the learning model 240. Such data can act to further refine sender reputation. One of the most suspicious actions is moving from a low volume sender to a high volume sender, which is typical of spammers. It is also the case that this scenario is likely to confuse a conventional spam filter such as an IP address-based filter, because there may not be sufficient polled data concerning low volume senders. As a result, a sender may be bad but low volume. If the sender becomes bad and high volume, the sender may not be caught because the system does not know they are bad yet. Injecting aggregated counts over sender activity can help detect this type of spam much faster than conventional technologies: a filter observing that the short term and long term volume counts are similar will "know" that a large recent spike in volume must have occurred, evidence of suspicious activity.

Further yet, it is to be noted that rather than treating activity data directly as training data, aggregated count information associated therewith is integrated into the system. There are a myriad of reasons for utilizing this approach including, without limitation, the facts that activity data is not extremely reliable and the volume thereof can overwhelm a filtering system.

Consider junk mail reports, for example. Users often make mistakes and forget that they subscribed to something, thus there can be an enormous volume of junk mail reports for a particular sender. If this were treated as trustworthy data, there would not necessarily be the right amount of good mail to cancel out the reports. User data polls have only about a 3% error rate. Accordingly, if someone receives a hundred poll messages, then ninety-seven times it will be tagged as good and three times it will be labeled as spam. Thus, it will probably be know as good overall. If junk mail reports are simply thrown in the mix with training data, the statistics become skewed in a way that is difficult to correct. For instance, if mail goes in someone's junk folder, a user may never report it as junk. Furthermore, if it is deleted by a server prior to delivery then such mail will not be available to report as junk.

One benefit of using counts rather than actual data is that it allows a system to consider an extremely large data set. For instance, there might be a hundred thousand messages a day that are hand labeled, which is the best data. However, there might also be a million junk mail reports and a million trap account messages. That volume of data might overwhelm a system.

To train the data model 240, component 220 can utilize the training data perhaps provided via a user poll and the activity data counts at the time the message was received. Accordingly, it is significant that data counts be utilized at the time the message was received rather than at the end or some other time for training purposes. By way of example, when someone creates a new IP address for spamming and then he/she starts spamming prolifically, when a new message comes in the counts are all zero. Later when the system is trained, overall counts are going to be very high because of the large volume, junk mail reports, etc. It is not proper to learn that only IP addresses with lots of junk mail reports are spam, because when the system receives a new message of a similar sort the actual counts that will be seen are zeros. In the end, what will be learned is what is good and what is spam based not only on the sender but also additional informational sources as well.

Figure 5:
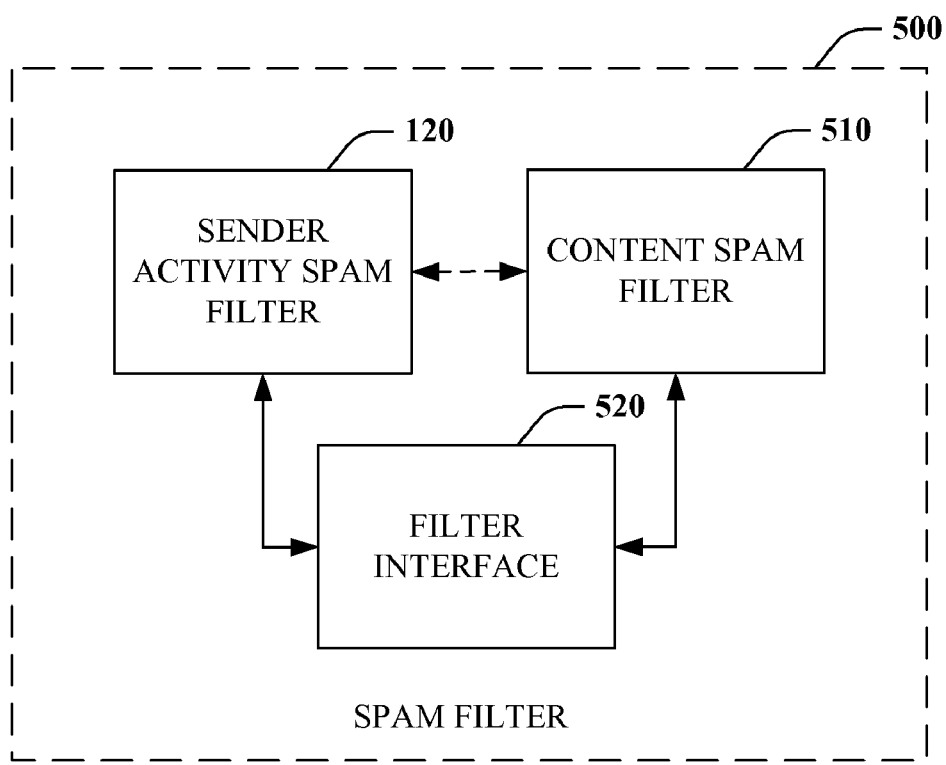
FIG. 5 is a block diagram of a hybrid spam filter.

Turning attention to FIG. 5, a hybrid spam filter 500 is illustrated in accordance with an aspect of the disclosure. The sender activity filter component 120 need not be utilized in isolation. More specifically, the sender activity filter component 120 can be employed in conjunction with other types of separately trained filters to produce the hybrid spam filter 500. In one embodiment, the sender activity filter component 120 can be utilized in combination with a textual or contextual spam filter 510 as shown. For example, the text filter can provide its output to the sender component to improve spam detection or vice versa. Filter components 120 and 510, amongst others can communicate directly with one another or through a filter interface component 520. Interface component 520 can facilitate provisioning of information such as spam probabilities between disparate spam filter components. Preliminary experiments show that the subject sender activity filter component 120 alone is better at detecting spam than conventional IP address based filters (or IP reputation filter) and context-based filters alone or in combination. Moreover, evidence suggests that the combination of sender activity filter component 120 and a conventional textual filter 510 can detect twice as much spam as any conventional IP address and context filter.

Sender centric spam filters should address the newcomer effect. As touched upon briefly supra, previously unseen sender messages are usually spam. The newcomer effect is a consequence of one-day spammer tactics, for example, where an IP address is created to send a high-volume of spam for a duration of one day or less. However, even though the amount of messages affected by this aggressive behavior is likely small, a filter should not be too biased against such senders as this may become problematic. There are numerous ways in which this can be handled. For example, a less aggressive threshold can be utilized for labeling messages as junk and/or spam. This threshold can be modified such that junk false positive rates (good labeled as bad) are lowered while the overall number of junk false positives is also reduced. A sending rate may also be limited or otherwise controlled to address this issue. Additionally or alternatively, content can be utilized as a safety net to prevent some messages from being improperly tagged as junk or spam. Yet another alternative is presented below with respect to FIG. 6.

Figure 6:
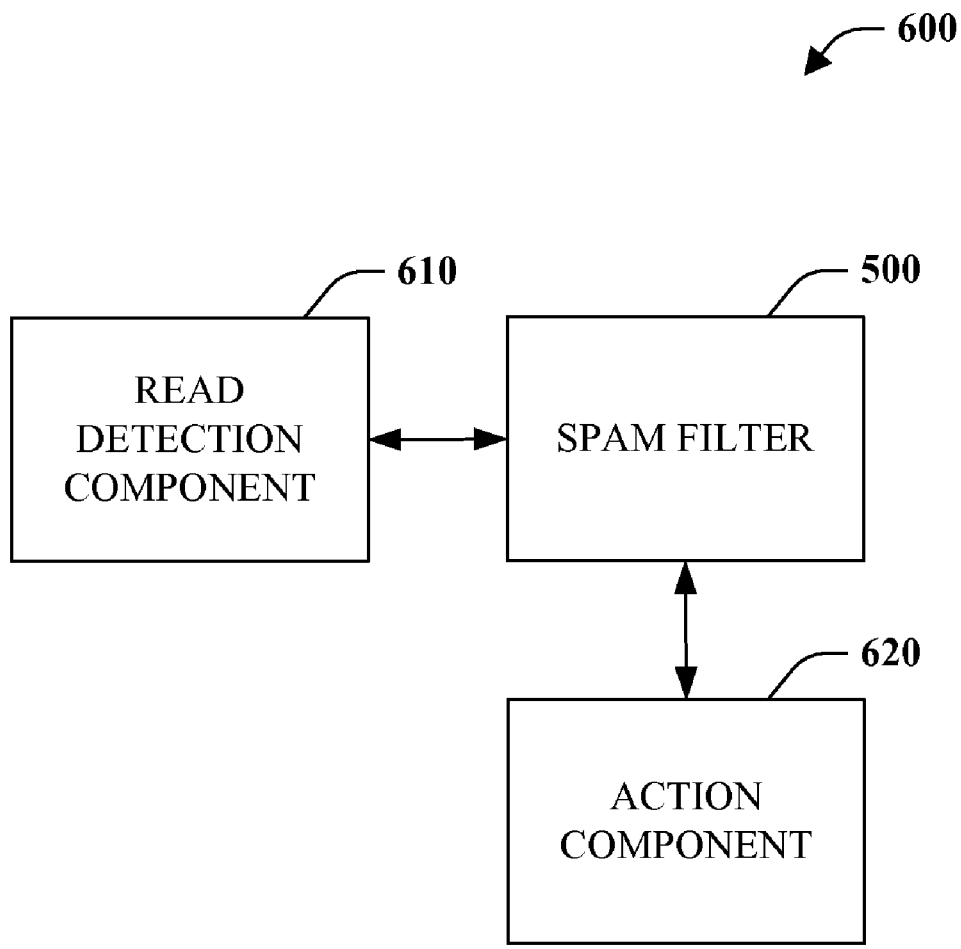
FIG. 6 is a block diagram of a spam detection system that supports read time classification and/or scoring.

FIG. 6 illustrates a spam detection system 600 in accordance with an aspect of the disclosure. System 600 enables delayed evaluation of messages to provide an opportunity for information to be collected and utilized with respect to message classification. Read detection component 610 provides a mechanism to detect or predict the time at which a message will be read. For example, logging into a message account can be detected or inferred by component 610. Upon detection or prediction, component 610 can initiate classification via spam filter component 500.

Spam filter component 500 can be composed of a sender filter alone or in conjunction with other filters such as content-based filters, among others. A message can be analyzed by the filter component 500 based on activity data associated with the message at read time. While this can be the only time a message is analyzed, a read-time re-scoring system can also be employed. That is, messages initially classified as spam can be deemed good based on a read-time analysis. In an alternative embodiment, the filter component 500 may be trained based on an assumed or inferred delay associated with when message is received and when it is read. In this manner, the filter component 500 can provide expected activity counts at read-time. Once analyzed, the spam filter component 500 can then produce a verdict such as a probability that a message is spam or a binary answer based on a threshold. The verdict can then be provided to action component 620.

Action component 620 can perform some action based on the classification obtained from spam filter component 500. By way of example, where the system is a consumer email program, read-time rescoring can lead to the action component moving a message from junk mail folder to inbox based on establishment of a more positive sender reputation at a later time. If the system is a message server, an action may be providing a message to a user or deleting a message based on the same or similar type of rescoring. For example, a message initially classified as spam may not be provided to a user messaging program, if read-time classification confirms the message is spam.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the spam filters 120, 510 and/or 500 can employ such mechanisms to facilitate intelligent classification of messages or other like items. Similarly, read detection component 610 can employ such mechanism and/or techniques to facilitate inferring message read time.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 7:
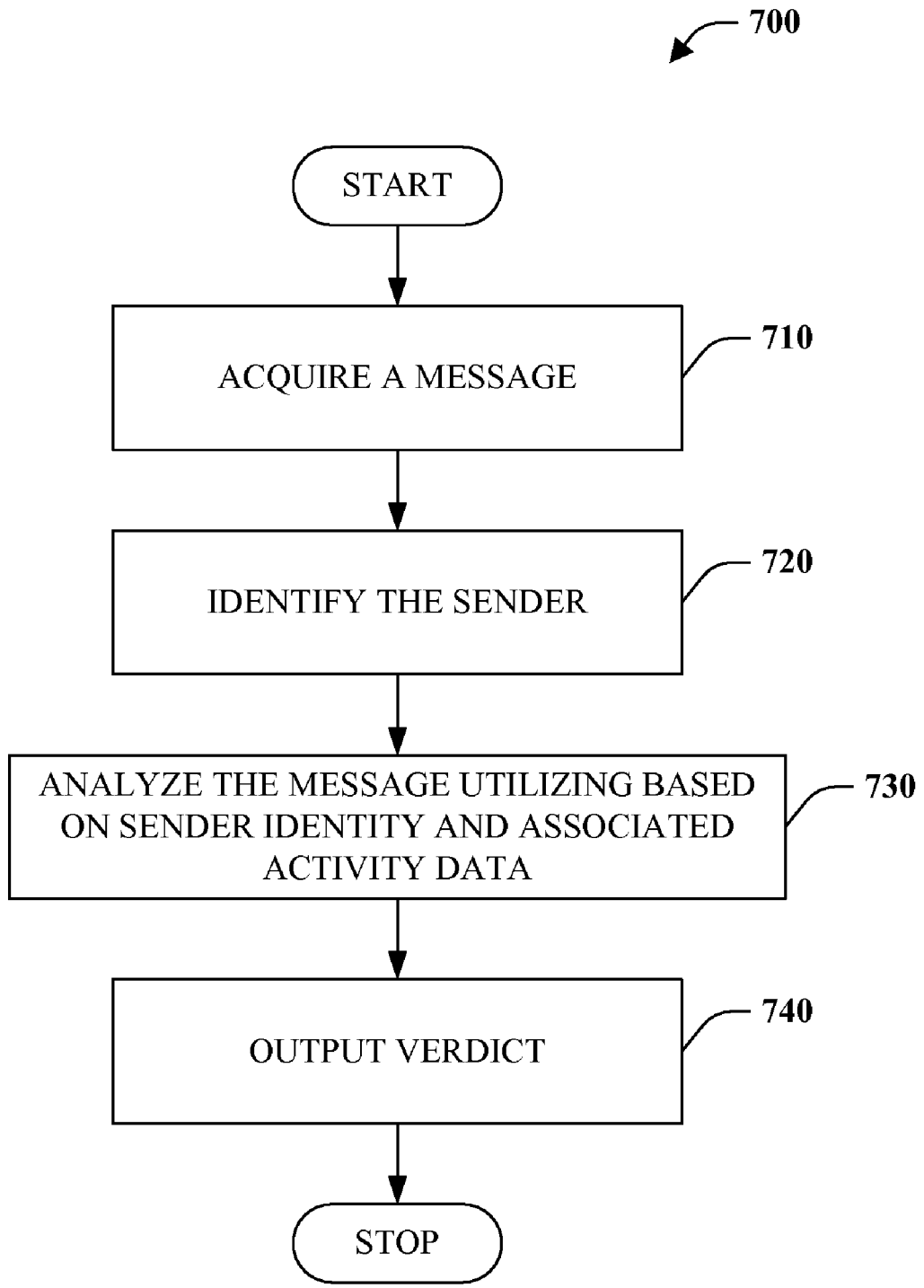
FIG. 7 is a flow chart diagram of a message classification method.

Referring to FIG. 7, a method 700 of message classification is depicted in accordance with an aspect of this detailed description. At reference numeral 710, a message is acquired (e.g., email, text message, fax, voice mail . . . ). The sender's identity is identified at numeral 720. Sender identity may correspond to an IP address, range of IP addresses, email address and/or sender domain, inter alia. At reference numeral 730, the message is analyzed based at least upon the sender's identity as well as activity data associated with the identity. Activity data can include, among other things, volume of messages sent, number of bounces, distinct hours mail was sent and/or arrived, volume of messages that arrive in a trap account and/or user reports such as junk mail and/or false positive reports. In one exemplary implementation, activity data can be collected from a database or service and utilized in the analysis. Alternatively, a pre-computed reputation score based on the activity data associated with the sender can be acquired and utilized to evaluate the message. Other information may also be considered in the analysis including message content. Based on the analysis of at least the sender identity and activity data, a verdict is output at reference numeral 740 indicative of whether the message is spam or non-spam. For instance, a probability that the message is spam or non-spam can be output and/or a binary response based on a threshold.

Figure 8:
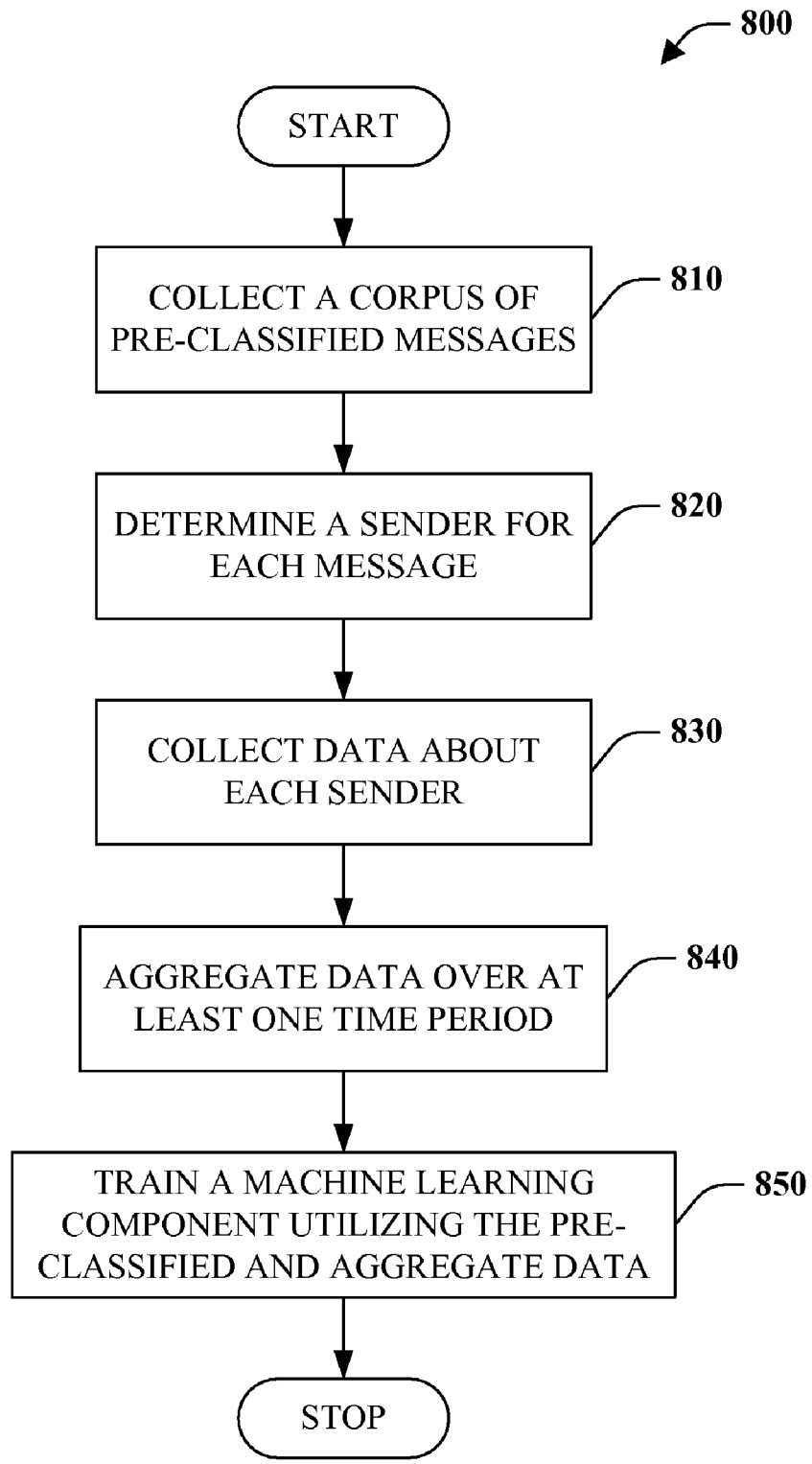
FIG. 8 is a flow chart diagram of a method of training a sender spam filter.

FIG. 8 depicts a method 800 of training a sender filter in accordance with an aspect of the disclosure. At numeral 810, a corpus of data or pre-classified messages known to be free of spam is collected. For example, such data can be collected from a database, service and/or polled users randomly selected to classify messages as spam or non-spam. A sender associated with each pre-classified message is then identified, for instance by email address, domain name, IP address or range of IP addresses at reference 820. At numeral 830, activity data is collected or acquired about each identified sender. Activity data can include, without limitation, volume of the sender (e.g., per message, per recipient, or both), number of bounced messages (e.g., bounces to and/or from sender), volume of messages to a trap account, time of sent messages, user junk mail receipts, user reported false positives and/or any combination or subset thereof. In accordance with one aspect herein, such data can be collected as count or occurrence data, for example ten messages sent and one junk mail received. At numeral 840, collected activity data is aggregated over at least one time period (e.g., volume the past day, two days, four days . . . ). Typically, each of the at least one time periods will end at approximately the time the message was received. At reference numeral 850, a sender spam filter and/or associated learning model can be trained utilizing the pre-classified messages, message sender identities and aggregated activity counts associated with the identities. Integrating activity data into the training as counts or aggregated counts is beneficial in that it allows enormous amounts of information to be captured concisely and mitigates training problems that would occur if activity data were employed directly as training data.

Figure 9:
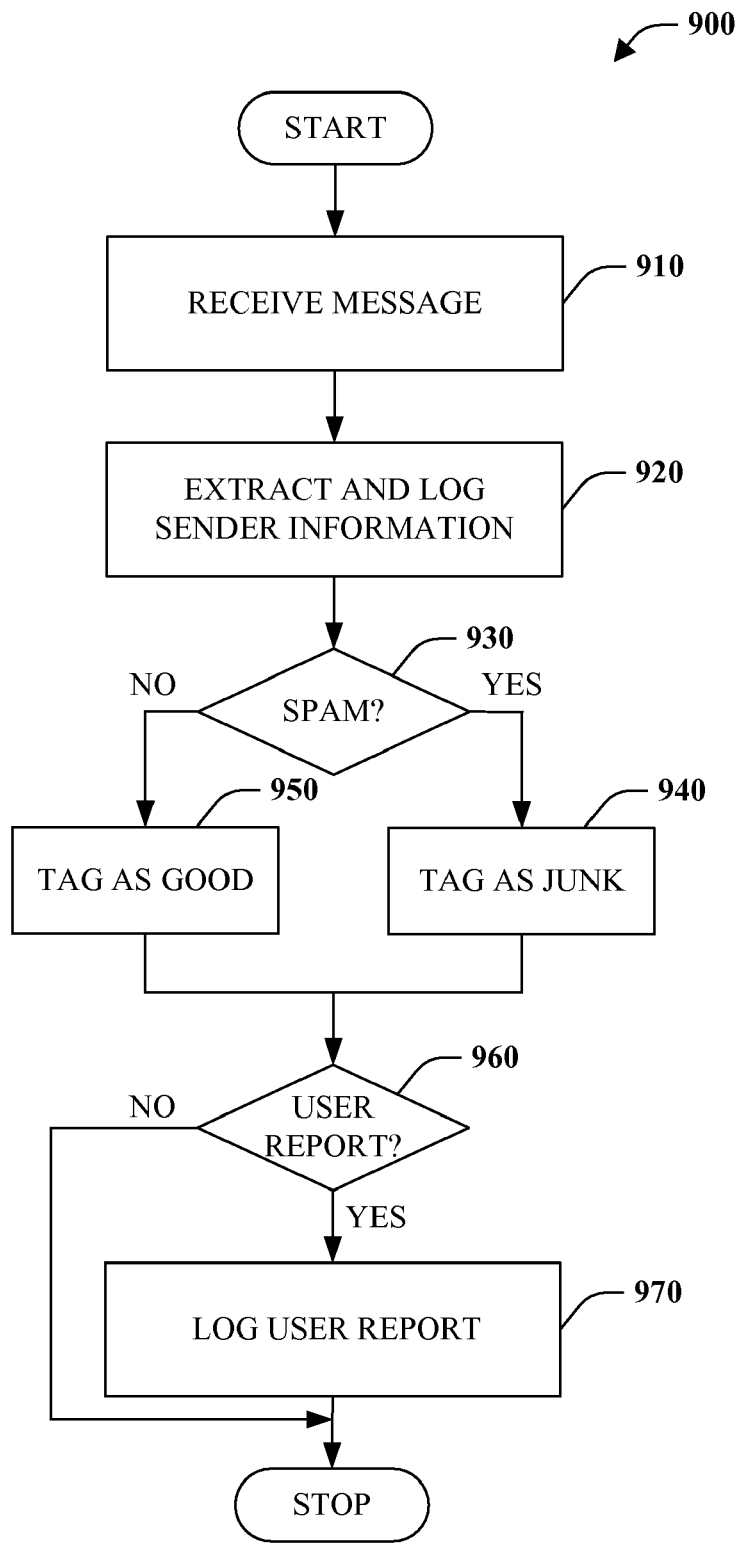
FIG. 9 is a flow chart diagram of a method of classifying messages.

FIG. 9 is a flow chart depicting a method 900 of message classification in accordance with an aspect of the disclosure. Method 900 can be employed by a user message application and/or a message server application. At reference numeral 910, a message is received. At numeral 920, sender information is extracted and logged. The sender information can include the identity of the sender as well as various activity data such as the time the message was sent, the number of recipients, bounce messages and the like. At reference numeral 930, a determination is made as to whether the message is spam or non-spam. Such determination can be derived from sender identity and activity data associated with the identity and/or message content. If the message is determined to be spam at 930 then the message is tagged as junk at 940, otherwise the message is labeled as good at 950. At reference number 960, a determination is made as to whether a user report such as a junk mail report or false positive report was received with respect to the message. If yes, then the report is logged at 970, for instance by incrementing the value of an appropriate variable associated therewith (e.g., JMR=0 to JMR=1). If no, the method 900 simply terminates.

Figure 10:
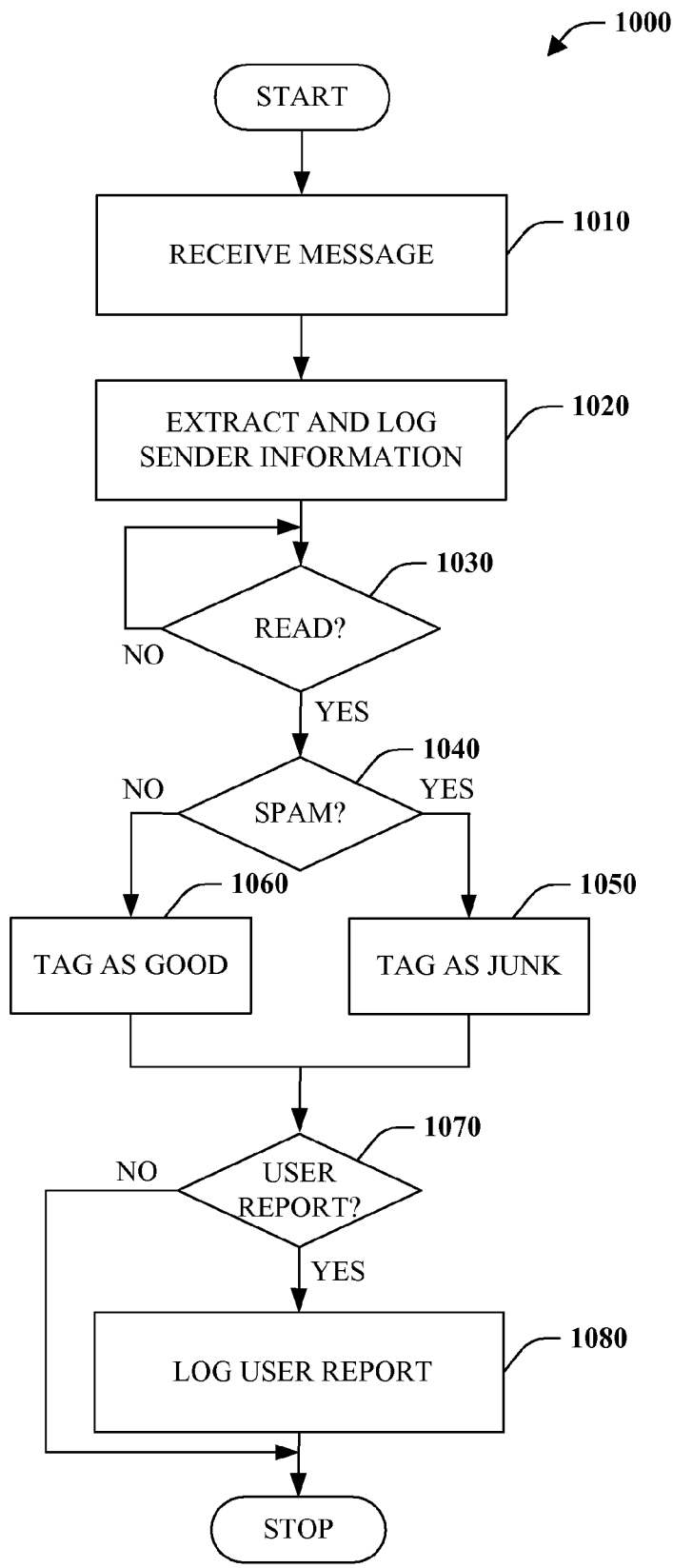
FIG. 10 is a flow chart diagram of a method of classifying messages.

FIG. 10 illustrates a method of message classification 1000 in accordance with an aspect of the disclosure. At reference numeral 1010, a message is received (e.g., email, text message fax . . . ). Sender information such as sender identity and activity data associated with the sender can be extracted and logged at numeral 1020. Activity data can include, without limitation, a time the message was sent, number of recipients, bounce messages and/or the like. At reference numeral 1030, a determination is made as to whether a read has been attempted, detected and/or inferred. For example, if a user logs on to their computer, initiates a message application or logs on to a message web site, then a read can be inferred. If no, then the method loops at 1030 until a read can be detected or inferred. If yes, then the method continues at 1040 where a determination is made as to whether the message is good or spam. The determination can be made based on user identity, activity data (e.g., aggregated counts) and/or message text or content. Accordingly, the message can be evaluated at read-time to allow maximum time for activity data to accumulate and therefore be useful in message classification. If at 1040 the message is determined to be spam then it is tagged or labeled as spam or junk at 1050. Otherwise, the message can be tagged or labeled as good at 1060. Such tagging can be important in considering if and/or how messages will be presented to recipients. Subsequently, a determination is made at 1070 as to whether any user reports such as junk mail or false positive reports have been made and/or received. If yes, such information is logged at 1080 with respect to the sender and the method 1000 terminates. If no, the method 1000 simply terminates.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, it should be appreciated that carrier waves can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
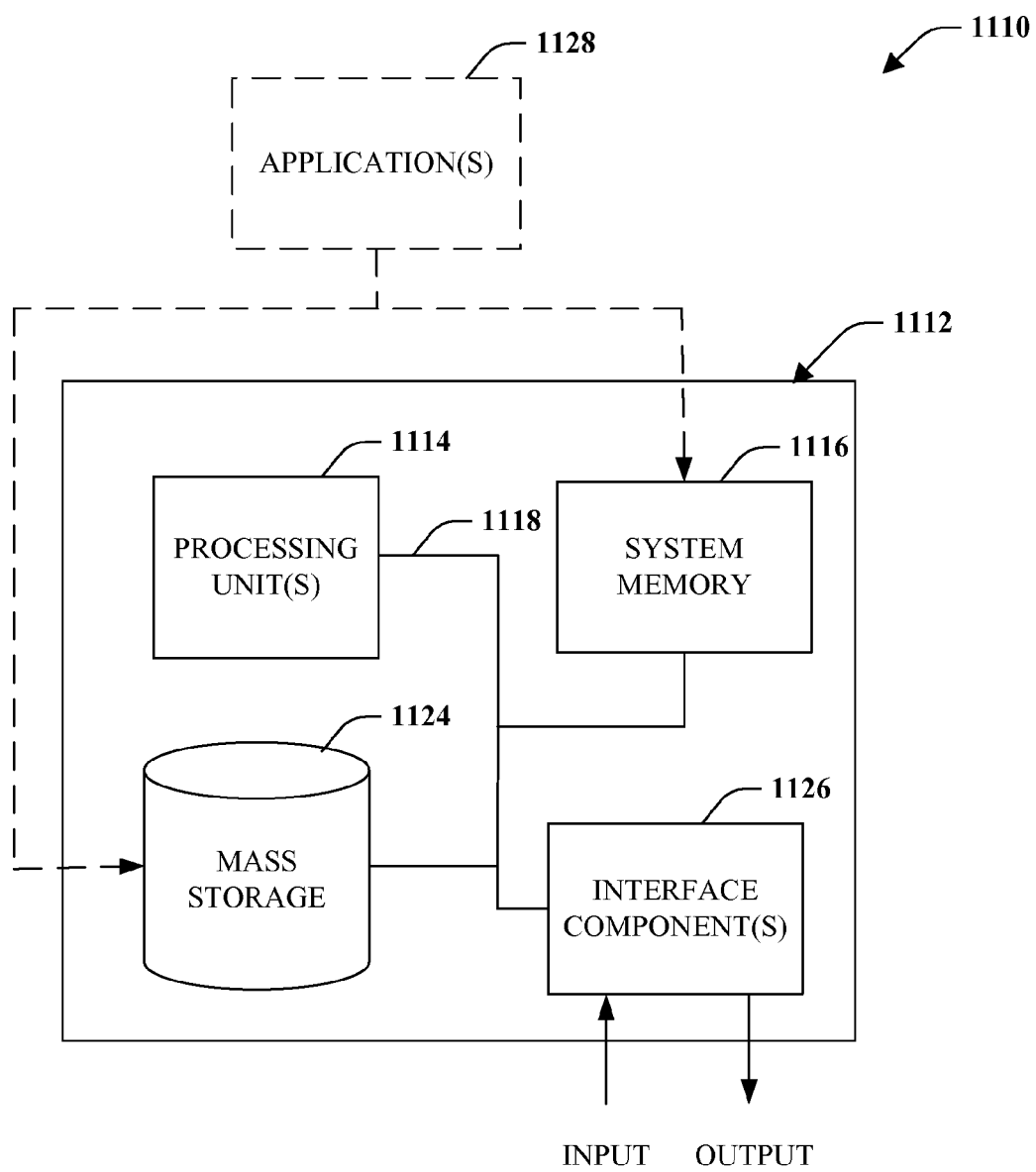
FIG. 11 is a schematic block diagram illustrating a suitable operating environment for aspects of the subject innovation.
Figure 12:
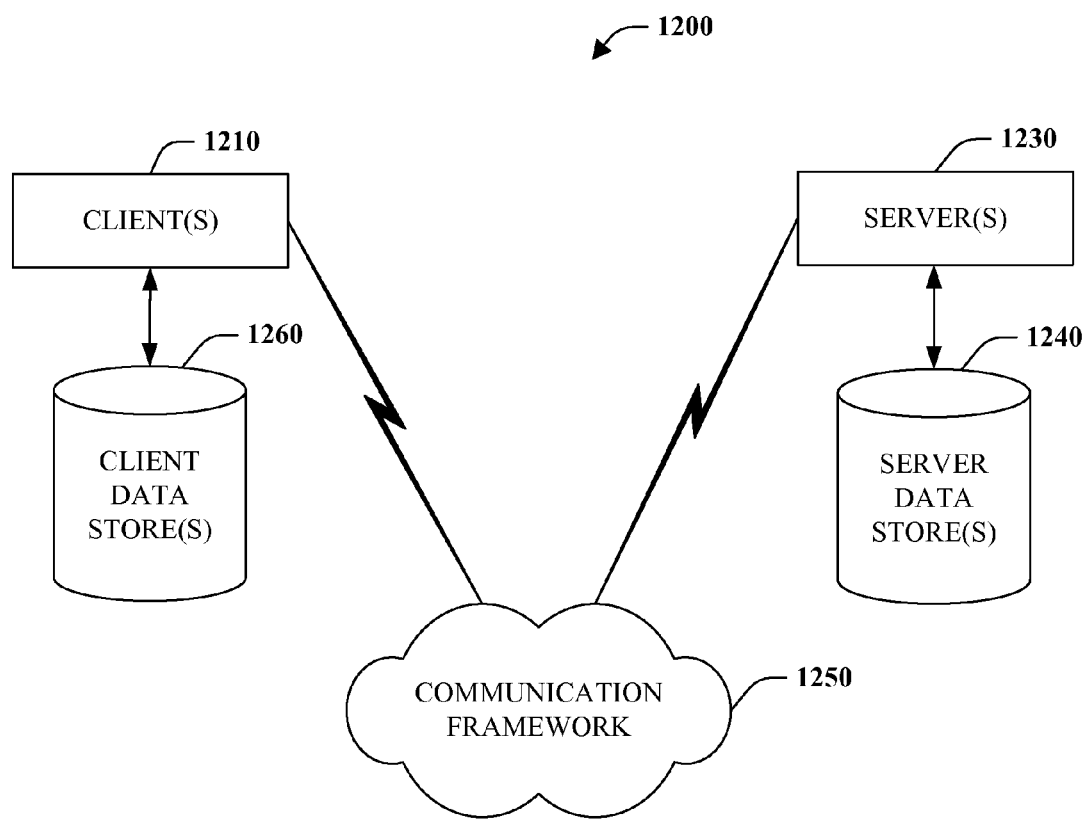
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor, multiprocessor or multi-core processor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/nonvolatile computer storage media. FIG. 11 illustrates, for example, mass storage 1124. Mass storage 1124 includes, but is not limited to, devices like a magnetic or optical disk drive, floppy disk drive, flash memory or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g., CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230. In accordance with an aspect of the disclosure, spam filtering functionality can be performed on the server 1230 such a messaging server, email server or the like and/or on the client(s) 1210 for example in conjunction with a messaging application. Furthermore, data stores 1240 and/or 1260 can be utilized to persist activity data associated with senders.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer-implemented method to facilitate spam detection, comprising:
   receiving a training corpus of data identified as spam or non-spam messages;
   receiving a plurality of messages;
   identifying an internet protocol (IP) address for each message of the plurality of messages;
   receiving activity data associated with a particular IP address, wherein the activity data comprises a count of a number of times the particular IP address issues a DATA or BDAT simple mail transport protocol (SMTP) command independent of other commands that might be employed to check the validity of an email address;
   aggregating the activity data associated with the particular IP address over at least one time period;
   training a machine learning system utilizing the training corpus and the aggregated activity data; and
   providing output of the machine learning system to a spam filter to identify spam.

2. The method of claim 1, identifying the IP address comprising identifying a range of internet protocol (IP) addresses.

3. The method of claim 1, further comprising aggregating data repeatedly for multiple end times corresponding to a time when training messages were received.

4. The method of claim 1, wherein receiving the activity data further comprises:
   receiving at least one of:
   a count of distinct hours during which messages arrived from the particular IP address,
   a volume of messages from the particular IP address that arrive in a trap account,
   a number of user false positive reports,
   IP address volume,
   a number of bounce messages coming from the particular IP address,
   a volume of messages from the particular IP address that bounce, or
   a volume of messages tagged as spam by a spam filter, and number of user-reported junk mail receipts.

5. The method of claim 1, wherein receiving the activity data further comprises receiving a count of a number of times the particular IP address sends a mail to command without proceeding to send an email message.

6. A computer-readable storage medium having executable instructions encoded thereon, the executable instructions, upon execution, configuring a processor to perform the method of claim 1.

7. A system for generating an intelligent spam detection system, comprising:
   a processor;
   a memory;
   a component stored in the memory and executed on the processor for identifying an internet protocol (IP) address for a message in a training set of data known to be spam or non-spam;
   a component stored in the memory and executed on the processor for acquiring activity data about the IP address of the message, wherein the activity data comprises a count of a number of times the IP address for the message sends a mail to command without proceeding to send an email message;
   a component stored in the memory and executed on the processor for training a machine learning model utilizing the training set; and
   a component for combining output of the machine learning model with a filter that identifies spam based on textual information.

8. The system of claim 7, wherein a component for aggregating, aggregates data for multiple end times corresponding to the times at which messages were received.

9. The system of claim 7, wherein the memory further comprises a component for identifying a particular sender by at least a range of IP addresses.

10. The system of claim 7, wherein a component for aggregating is configured to count a number of times that an IP address associated with a sender issues a BDAT simple mail transport protocol (SMTP) command or DATA SMTP command.

11. The system of claim 7, wherein the component for acquiring activity data acquires at least one of:
   a count of distinct hours when mail is sent from the IP address;
   a volume of messages from the IP address that arrive in a trap account; and
   a number of receiver reported false positives.

12. A tangible computer storage medium having computer-executable instructions comprising modules for programming a computer to perform operations, the modules comprising:
   a module that upon execution on a processor programs a computer to identify an internet protocol (IP) address for a message in a training set of data known to be spam or non-spam;
   a module that upon execution on the processor programs the computer to acquire activity data about the IP address of the message, wherein the activity data comprises a count of a number of times the IP address for the message sends a mail to command without proceeding to send an email message;
   a module that upon execution on the processor programs the computer to train a machine learning model utilizing the training set; and
   a module that upon execution on the processor programs the computer to provide output of the machine learning model with a spam filter that identifies spam.

13. The tangible computer storage medium of claim 12, further comprising a module that upon execution on the processor programs the computer to aggregate data for multiple end times corresponding to the times at which email messages were received.

14. The tangible computer storage medium of claim 12, further comprising a module that upon execution on the processor programs the computer to identify a particular sender by at least a range of IP addresses.

15. The tangible computer storage medium of claim 12, further comprising a module that upon execution on the processor programs the computer to aggregate data, wherein the module for aggregating is configured to count a number of times that an IP address associated with a sender issues a BDAT simple mail transport protocol (SMTP) command or DATA SMTP command.

16. The tangible computer storage medium of claim 12, further comprising a read detection module to determine a time that a sent message will be read.

17. The tangible computer storage medium of claim 12, wherein the module for acquiring activity data acquires at least one of:

a count of distinct hours when mail is sent from the IP address;

a volume of messages from the IP address that arrive in a trap account; or a number of receiver reported false positives.

\* \* \* \* \*